United States Patent
Matsumura

(10) Patent No.: US 12,365,817 B2
(45) Date of Patent: Jul. 22, 2025

(54) HOT-MELT COMPOSITION

(71) Applicant: SIKA TECHNOLOGY AG, Baar (CH)

(72) Inventor: Misaki Matsumura, Hiratsuka (JP)

(73) Assignee: SIKA TECHNOLOGY AG, Baar (CH)

( * ) Notice: Subject to any disclaimer, the term of this patent is extended or adjusted under 35 U.S.C. 154(b) by 157 days.

(21) Appl. No.: 18/269,434

(22) PCT Filed: Dec. 6, 2021

(86) PCT No.: PCT/JP2021/044651
§ 371 (c)(1),
(2) Date: Jun. 23, 2023

(87) PCT Pub. No.: WO2022/138099
PCT Pub. Date: Jun. 30, 2022

(65) Prior Publication Data
US 2024/0059931 A1 Feb. 22, 2024

(30) Foreign Application Priority Data

Dec. 23, 2020 (JP) ................. 2020-213744

(51) Int. Cl.
*C09J 7/35* (2018.01)
*C09J 11/06* (2006.01)
*C09J 11/08* (2006.01)
*C09J 125/04* (2006.01)

(52) U.S. Cl.
CPC ............... *C09J 7/35* (2018.01); *C09J 11/06* (2013.01); *C09J 11/08* (2013.01); *C09J 125/04* (2013.01); *C09J 2203/354* (2020.08)

(58) Field of Classification Search
CPC . C09J 11/06; C09J 11/08; C09J 125/04; C09J 153/025; C08L 91/00
See application file for complete search history.

(56) References Cited

FOREIGN PATENT DOCUMENTS

| CN | 112094608 A | 12/2020 | | |
|---|---|---|---|---|
| EP | 1 584 654 A1 | 10/2005 | | |
| JP | H01-217093 A | 8/1989 | | |
| JP | H03-188175 A | 8/1991 | | |
| JP | H09-208928 A | 8/1997 | | |
| JP | 2001-11409 A | 1/2001 | | |
| JP | 2011195797 A | * | 10/2011 | ............ C08L 23/147 |
| JP | 2012-77251 A | 4/2012 | | |
| JP | 2018-104594 A | 7/2018 | | |
| JP | 2019-73581 A | 5/2019 | | |
| JP | 6634044 B2 | 1/2020 | | |
| JP | 2020-76101 A | 5/2020 | | |

OTHER PUBLICATIONS

English Translation of the Feb. 22, 2022, International Search Report in International Application No. PCT/JP2021/044651.
Jun. 13, 2023, International Preliminary Report on Patentability issued in International Application No. PCT/JP2021/044651.

* cited by examiner

*Primary Examiner* — Daniel McNally
(74) *Attorney, Agent, or Firm* — Oliff PLC

(57) ABSTRACT

An object of the present invention is to provide a hot-melt composition which has excellent workability, hot flow resistance, balance between adhesion and detachability, volatility resistance, and hot creep resistance. The present invention is a hot-melt composition comprising: as thermoplastic elastomers (1), a styrene-based thermoplastic elastomer (1a) having a weight average molecular weight of 300,000 or more, a styrene-based thermoplastic elastomer (1b) having a styrene content of no greater than 20% by mass, and an olefin-based thermoplastic elastomer (1c) including an ethylene propylene rubber and/or butyl rubber; as tackifiers (2), an aromatic petroleum resin (2a), a terpene phenol resin (2b), and an amorphous polyalphaolefin (2c); a high molecular weight paraffin oil (3a) having a weight average molecular weight of 1,000 or more; and a low molecular weight paraffin oil (3b) having a weight average molecular weight of less than 1,000.

5 Claims, No Drawings

HOT-MELT COMPOSITION

TECHNICAL FIELD

The present invention relates to hot-melt compositions.

BACKGROUND ART

Conventionally, hot-melt compositions have been used for bonding lenses and housings in automobile lighting fixtures (for example, automobile lamps such as headlamps).

Hot-melt compositions used for bonding lenses and housings in automobile lighting fixtures are required to have: good workability (specifically, for example, the viscosity of the hot-melt composition when applying the hot-melt composition to a substrate is required to be within a suitable range; same hereinafter) good hot flow resistance (specifically, for example, after bonding a substrate with the hot-melt composition, the hot-melt composition (adhesive layer) should not readily soften or deform under high temperature conditions; same hereinafter); good balance between adhesion and detachability; good volatility resistance (such that the inside of the automobile lighting fixture (automobile lamp) is less susceptible to fogging); and good hot creep resistance (maintenance of adhesion under heating and load).

Adhesion means adhesion after bonding a first member and a second member using the hot-melt composition.

Detachability (separability) means that when a first member and a second member have been bonded using the hot-melt composition and then the second member is removed from the first member, the cured product resulting from the hot-melt composition having solidified allows for easy interface-peeling from the first member or the second member, and that the adhesive layer does not readily tear when the cured product is separated from a substrate (adherend).

Patent Documents 1 and 2, for example, have proposed hot-melt compositions that can be used for bonding lenses and housings in automobile lighting fixtures.

Patent Document 1 discloses a hot-melt composition comprising: a styrene-based thermoplastic elastomer having a weight average molecular weight of 300,000 or more;

a tackifier;

a paraffin oil 1 having a weight average molecular weight of 1,000 or more;

and a paraffin oil 2 having a weight average molecular weight of less than 1,000.

Patent Document 2 discloses an easy-detach hot-melt composition characterized by including, with respect to 100 parts by weight of a SEEPS block copolymer (A) having a weight average molecular weight of 150,000 or more, 300 to 1,000 parts by weight of a paraffin oil (B) having a kinematic viscosity (40° C.) of 200 to 1,000 mm$^2$/s, 50 to 400 parts by weight of an aromatic petroleum resin (C) having a softening point of 100° C. or higher, and 50 to 600 parts by weight of a terpene resin (D), and not including polypropylene wax. Furthermore, Patent Document 2 discloses that, when a terpene phenol resin is used as a tackifier, detachability tends to be poor.

PRIOR ART DOCUMENTS

Patent Documents

Patent Document 1: JP 2018-104594 A
Patent Document 2: JP 6634044 B

SUMMARY OF THE INVENTION

Problems to be Solved by the Invention

Here, referring to Patent Documents 1 and 2, the present inventor prepared and evaluated hot-melt compositions, whereupon it became clear that, with such compositions, there were cases in which at least one of the workability, hot flow resistance, balance between adhesion and detachability, volatility resistance, and hot creep resistance was poor.

Thus, an object of the present invention is to provide a hot-melt composition which has good workability, hot flow resistance, balance between adhesion and detachability, volatility resistance, and hot creep resistance.

Means for Solving the Problems

As a result of extensive research directed to solving the problems described above, the present inventor found that the desired effects can be archived with a hot-melt composition: comprising, as thermoplastic elastomers (1), a styrene-based thermoplastic elastomer (1a) having a weight average molecular weight of 300,000 or more, a styrene-based thermoplastic elastomer (1b) having a styrene content of no greater than 20% by mass, and an olefin-based thermoplastic elastomer (1c) including an ethylene propylene rubber and/or butyl rubber;

comprising, as tackifiers (2), an aromatic petroleum resin (2a), a terpene phenol resin (2b), and an amorphous polyalphaolefin (2c); and comprising, as paraffin oils, a high molecular weight paraffin oil (3a) having a weight average molecular weight of 1,000 or more and a low molecular weight paraffin oil (3b) having a weight average molecular weight of less than 1,000, and thus arrived at the present invention.

The present invention is based on findings described above and the like, and specifically solves the problems described above by way of the following configuration.

[1] A hot-melt composition comprising: as thermoplastic elastomers (1), a styrene-based thermoplastic elastomer (1a) having a weight average molecular weight of 300,000 or more, a styrene-based thermoplastic elastomer (1b) having a styrene content of no greater than 20% by mass, and an olefin-based thermoplastic elastomer (1c) including an ethylene propylene rubber and/or butyl rubber;

as tackifiers (2), an aromatic petroleum resin (2a), a terpene phenol resin (2b), and an amorphous polyalphaolefin (2c);

a high molecular weight paraffin oil (3a) having a weight average molecular weight of 1,000 or more; and and a low molecular weight paraffin oil (3b) having a weight average molecular weight of less than 1,000.

[2] The hot-melt composition according to [1], wherein the content of the styrene-based thermoplastic elastomer (1b) is 10-50 parts by mass, with respect to 100 parts by mass of the styrene-based thermoplastic elastomer (1a).

[3] The hot-melt composition according to [1] or [2], wherein the content of the olefin-based thermoplastic elastomer (1c) is 30-70 parts by mass, with respect to 100 parts by mass of the styrene-based thermoplastic elastomer (1a).

[4] The hot-melt composition according to any one of [1] to [3], wherein the styrene-based thermoplastic elastomer (1a) includes SEEPS.

[5] The hot-melt composition according to any one of claims [1] to [4], wherein the total content of the aromatic petroleum resin (2a) and the terpene phenol resin (2b) is 200-600 parts by mass, with respect to 100 parts by mass of the styrene-based thermoplastic elastomer (1a).

[6] The hot-melt composition according to any one of claims [1] to [5], wherein the use is for automobile lamps.

Effects of the Invention

The hot-melt composition of the present invention has good workability, hot flow resistance, balance between adhesion and detachability, volatility resistance, and hot creep resistance.

MODES FOR CARRYING OUT THE INVENTION

Hereafter, the present invention will be described in detail.

Note that, in the present specification, numerical ranges expressed using "to" mean ranges including the numerical values before and after "to" as lower and upper limits.

In the present specification, unless otherwise specified, each component can be used in the form of one substance corresponding to the component alone or in the form of combinations of two or more thereof. If the component includes two or more substances, the content of the component refers to the total content of the two or more substances.

As used herein, (meth)acrylic indicates acrylic or methacrylic.

In the present specification, at least one of workability, hot flow resistance, balance between adhesion and detachability, volatility resistance, and hot creep resistance being better, means that the effect of the present invention is better. A better balance between adhesion and detachability means, for example, that, while maintaining the adhesive force (peel strength) required for adhesion, the peel strength can be lowered, which is required for detachment.

[Hot-Melt Composition]

The hot-melt composition of the present invention (the composition of the present invention) is a hot-melt composition comprising:

as thermoplastic elastomers (1), a styrene-based thermoplastic elastomer (1a) having a weight average molecular weight of 300,000 or more, a styrene-based thermoplastic elastomer (1b) having a styrene content of no greater than 20% by mass, and an olefin-based thermoplastic elastomer (1c) including an ethylene propylene rubber and/or butyl rubber;

as tackifiers (2), an aromatic petroleum resin (2a), a terpene phenol resin (2b), and an amorphous polyalphaolefin (2c);

a high molecular weight paraffin oil (3a) having a weight average molecular weight of 1,000 or more; and a low molecular weight paraffin oil (3b) having a weight average molecular weight of less than 1,000.

Each component comprised in the composition of the present invention will be described in detail below.

Note that the styrene-based thermoplastic elastomer (1a) having a weight average molecular weight of 300,000 or more, which is comprised in the composition of the present invention, may be referred to as "specific St-based elastomer (1a)" or simply "(1a)".

Furthermore, the styrene-based thermoplastic elastomer (1b) having a styrene content of no greater than 20% by mass may be referred to as "specific St-based elastomer (1b)" or simply "(1b)".

The olefin-based thermoplastic elastomer (1c) may be referred to as "specific olefin-based thermoplastic elastomer (1c)" or simply "(1c)".

The high molecular weight paraffin oil (3a) having a weight average molecular weight of 1,000 or more may be referred to as "high molecular weight paraffin oil (3a)" or simply "(3a)".

The low molecular weight paraffin oil (3b) having a weight average molecular weight of less than 1,000 may be referred to as "low molecular weight paraffin oil (3b)" or simply "(3b)".

<<Thermoplastic Elastomers (1)>>

The composition of the present invention comprises, as thermoplastic elastomers (1), a styrene-based thermoplastic elastomer (1a) having a weight average molecular weight of 300,000 or more, a styrene-based thermoplastic elastomer (1b) having a styrene content of no greater than 20% by mass, and an olefin-based thermoplastic elastomer (1c). Furthermore, the olefin-based thermoplastic elastomer (1c) includes ethylene propylene rubber and/or butyl rubber.

In the present invention, the term thermoplastic elastomer refers to a polymer that softens when heated and has rubber elasticity when cooled.

A styrene-based thermoplastic elastomer refers to a block copolymer having a polymer block with a repeating unit formed from styrene or a styrene derivative and a polymer block comprising a structural unit derived from a conjugated diene.

<Styrene-Based Thermoplastic Elastomer (1a)>

In the present invention, the styrene-based thermoplastic elastomer (1a) comprised as the thermoplastic elastomer (1) has a weight average molecular weight of 300,000 or more. Because the specific St-based elastomer (1a) is comprised, the composition of the present invention has good hot flow resistance.

Examples of the styrene-based thermoplastic elastomer (1a) include styrene isoprene styrene block copolymer (SIS), styrene butadiene styrene block copolymer (SBS), styrene ethylene propylene styrene block copolymer (SEPS), styrene ethylene butylene styrene block copolymer (SEBS), and styrene ethylene ethylene propylene styrene block copolymer (SEEPS).

In view of the effects of the present invention being better, the styrene-based thermoplastic elastomer (1a) preferably includes SEEPS.

<Weight Average Molecular Weight of the Styrene-Based Thermoplastic Elastomer (1a)>

In the present invention, the styrene-based thermoplastic elastomer (1a) has a weight average molecular weight of 300,000 or more.

In view of the effects of the present invention being better and the heat resistance, mechanical properties, and detachability being good, the weight average molecular weight (Mw) of the styrene-based thermoplastic elastomer (1a) is preferably 300,000 to 600,000, more preferably 300,000 or more but less than 500,000, and still more preferably 350,000 or more but less than 450,000.

In the present invention, the weight average molecular weight of the styrene-based thermoplastic elastomer (1a) refers to the weight average molecular weight as calculated for standard polystyrene, based on values measured by gel permeation chromatography (GPC). The measurement conditions for the weight average molecular weight of the styrene-based thermoplastic elastomer (1a) are as follows.
(Measurement Conditions)
  GPC: LC Solution (made by SHIMAZU)
  Detector: SPD-20A (made by SHIMAZU)
  Column: two ALPHA-5000s (made by TOSO) connected in series
  Solvent: tetrahydrofuran
  Temperature: 40° C.
  Flow rate: 0.5 ml/min
  Concentration: 2 mg/ml
  Standard sample: polystyrene
Styrene Content In view of the effects of the present invention being better and the heat resistance and mechanical properties being good, the styrene content of styrene-based thermoplastic elastomer (1a) is preferably 25 to 40 mass % and more preferably 25 to 35 mass % of the styrene-based thermoplastic elastomer (1a).

The styrene content of the styrene-based thermoplastic elastomer means the ratio of content of repeating units of styrene in the styrene-based thermoplastic elastomer.

In the present invention, the styrene content of the styrene-based thermoplastic elastomer can be measured by pyrolysis-GC-MS (pyrolysis gas chromatograph-mass spectrometer) (same hereinafter).

The styrene content (% by mass) of the styrene-based thermoplastic elastomer may be defined as the proportion of styrene and/or styrene derivatives in the total amount of monomers used to produce the styrene-based thermoplastic elastomer.

<Styrene-Based Thermoplastic Elastomer (1b)>

In the present invention, the styrene content of the styrene-based thermoplastic elastomer (1b) comprised as the thermoplastic elastomer (1) is no greater than 20% by mass.

Because the styrene-based thermoplastic elastomer (1b) is comprised, the composition of the present invention has good workability and balance between adhesion and detachability.

Examples of the styrene-based thermoplastic elastomer (1b) include styrene isoprene styrene block copolymer (SIS), styrene butadiene styrene block copolymer (SBS), styrene ethylene propylene styrene block copolymer (SEPS), styrene ethylene butylene styrene block copolymer (SEBS), and styrene ethylene ethylene propylene styrene block copolymer (SEEPS).

In view of the effects of the present invention being better, the styrene-based thermoplastic elastomer (1b) preferably includes SEPS and/or SEBS, more preferably SEPS.

Examples of SEPS include polymers represented by the following formula.

[Chemical Formula 1]

$$\left[\begin{array}{c}CH_2-CH\\ \phantom{CH_2}\big|\\ \phantom{CH_2}\bigcirc\end{array}\right]_l \left[\begin{array}{c}CH_2-CH-CH_2-CH_2\\ \phantom{CH_2}\big|\\ \phantom{CH_2}CH_2\end{array}\right]_m \left[\begin{array}{c}CH_2-CH\\ \phantom{CH_2}\big|\\ \phantom{CH_2}\bigcirc\end{array}\right]_n$$

In the formula above, l+m+n can be a value corresponding to the weight average molecular weight of the styrene-based thermoplastic elastomer (1b), described hereafter, and l+n can be a value corresponding to the styrene content of the styrene-based thermoplastic elastomer (1b), described hereafter.

<Styrene Content>

In the present invention, the styrene content of the styrene-based thermoplastic elastomer (1b) is no greater than 20% by mass.

In view of the effects of the present invention (in particular, workability and balance between adhesion and detachability) being better, the styrene content of the styrene-based thermoplastic elastomer (1b) is preferably 10 to 18 mass % and more preferably 10 to 15 mass % of the styrene-based thermoplastic elastomer (1a).

The method for measuring the styrene content of the styrene-based thermoplastic elastomer (1b) is the same as described above.

(Weight Average Molecular Weight of the Styrene-Based Thermoplastic Elastomer (1b))

In view of the effects of the present invention being better, the weight average molecular weight (Mw) of the styrene-based thermoplastic elastomer (1b) is preferably less than 300,000, more preferably 50,000 to 250,000, and still more preferably 100,000 to 200,000.

The method for measuring the weight average molecular weight of the thermoplastic styrene-based elastomer (1b) is the same as the method for measuring the weight average molecular weight of the thermoplastic styrene-based elastomer (1a).

(Content of the Styrene-Based Thermoplastic Elastomer (1b))

In view of the effects of the present invention (in particular, workability and/or balance between adhesion and detachability) being better, the content of the styrene-based thermoplastic elastomer (1b) is preferably 10 to 50 parts by mass and more preferably 20 to 40 parts by mass, with respect to 100 parts by mass of the thermoplastic styrene-based elastomer (1a).

<Olefin-Based Thermoplastic Elastomer (1c)>

The composition of the present invention comprises an olefin-based thermoplastic elastomer (1c) as a thermoplastic elastomer (1), and the olefin-based thermoplastic elastomer (1c) includes ethylene propylene rubber and/or butyl rubber.

Because the olefin-based thermoplastic elastomer (1c) is comprised, the composition of the present invention has good workability and hot creep resistance.

In view of the effects of the present invention (in particular, the balance between adhesion and detachability and the hot creep resistance) being better, the olefin-based thermoplastic elastomer (1c) preferably includes ethylene propylene rubber.

(Ethylene Propylene Rubber)

Ethylene propylene rubber, serving as an olefin-based thermoplastic elastomer (1c), is a copolymer rubber of only ethylene and propylene. Note that, in the present invention, ethylene propylene rubber does not include ethylene propylene diene rubber (EPDM).

(Butyl Rubber)

Butyl rubber is a copolymer rubber of isobutene and isoprene. In general, the main component in the repeating units constituting butyl rubber is isobutene repeating units.

(Weight Average Molecular Weight of the Olefin-Based Elastomer (1c))

In view of the effects of the present invention being better, the weight average molecular weight (Mw) of the olefin-based thermoplastic elastomer (1c) is preferably 200,000 to 500,000 and more preferably 300,000 to 400,000.

The method for measuring the weight average molecular weight of the olefin-based thermoplastic elastomer (1c) is as follows.
(Measurement Conditions)
GPC: HLC-8321GPC/HT (made by Tosoh)
Detector: Differential Refractive Index (RI) made by Tosoh
Column: One TSKgel guard column HHR (S) and two TSKgel GMHHR-H (S) HTs connected in series
Solvent: o-dichlorobenzene
Temperature: 145° C.
Flow rate: 1.0 ml/min
Concentration: 0.1 wt %/vol %
Standard sample: polystyrene
(Content of the Olefin-Based Thermoplastic Elastomer (1c))

In view of the effects of the present invention (in particular, the balance between adhesion and detachability and hot creep resistance) being better, the content of olefin-based thermoplastic elastomer (1c) (content of ethylene propylene rubber or butyl rubber; when ethylene propylene rubber and butyl rubber are used in combination for the olefin-based thermoplastic elastomer (1c), the total content of both) is preferably 30 to 70 parts by mass and more preferably 40 to 60 parts by mass, with respect to 100 parts by mass of the styrene-based thermoplastic elastomer (1a).

<<Tackifiers (2)>>

The composition of the present invention comprises an aromatic petroleum resin (2a), a terpene phenol-based resin (2b), and an amorphous polyalphaolefin (2c), as tackifiers (2).

In the present invention, the tackifiers (2) can impart tackiness to the hot-melt composition.

Note that the thermoplastic elastomers (1) do not include the tackifiers (2).

<Aromatic Petroleum Resin (2a)>

The aromatic petroleum resin (2a) comprised as a tackifier (2) in the present invention refers to a resin having an aromatic hydrocarbon group.

In terms of the aromatic petroleum resin (2a) a polymer can be mentioned as one preferred embodiment.

Examples of the aromatic petroleum resin (2a) include polymers of styrene-based monomers (for example, styrene, α-methyl-styrene, or 4-methyl-α-methyl-styrene).

Aromatic hydrocarbon-based resins may be mentioned as the aromatic petroleum resin (2a).

(Content of the Aromatic Petroleum Resin (2a))

In view of the effects of the present invention being better, the content of the aromatic petroleum resin (2a) is preferably 100 to 500 parts by mass, more preferably 150 to 300 parts by mass, and even more preferably 180 to 220 parts by mass, with respect to 100 parts by mass of the styrene-based thermoplastic elastomer (1a).

<Terpene Phenol Resin (2b)>

The terpene phenol resin (2b) comprised as a tackifier (2) in the present invention refers to a polymer including a structural unit derived from a terpene compound and a structural unit derived from a phenol-based compound.

Because the terpene phenol resin (2b) is comprised, the composition of the present invention has good workability and balance between adhesion and detachability.

Examples of terpene compounds that can constitute the terpene phenol resin (2b) include monoterpenes such as α-pinene, β-pinene, and limonene (including d-forms, l-forms, and d/l-forms (dipentene)).

Examples of phenol-based compounds that can constitute the terpene phenol resin (2b) include, phenol, m-cresol, o-cresol, p-cresol, bisphenol A, and the like.

Examples of the terpene phenol resin (2b) include copolymers of terpenes and phenol compounds (terpene-phenol copolymer resins), homopolymers or copolymers of terpenes modified with phenol (phenol-modified terpene resins), and hydrogenated terpene phenol resins obtained by hydrogenating these.

(Content of the Terpene Phenol Resin (2b))

In view of the effects of the present invention being better, the content of the terpene phenol resin (2b) is preferably 100 to 300 parts by mass, more preferably 110 to 200 parts by mass, and even more preferably 120 to 180 parts by mass, with respect to 100 parts by mass of the styrene-based thermoplastic elastomer (1a).

(Total Content of the Aromatic Petroleum Resin (2a) and the Terpene Phenol-Based Resin (2b))

In view of the effects of the present invention being better, the total content of the aromatic petroleum resin (2a) and the terpene phenol-based resin (2b) is preferably 200 to 600 parts by mass, more preferably 200 to 500 parts by mass, and even more preferably 300 to 400 parts by mass, with respect to 100 parts by mass of the styrene-based thermoplastic elastomer (1a).

<Amorphous Polyalphaolefin (2c)>

The amorphous polyalphaolefin (2c) refers to a non-crystalline (amorphous) polymer, the main chain skeleton of which is derived from an α-olefin.

Examples of the amorphous polyalphaolefin (2c) include: homopolymers of ethylene, propylene, and butene;
and copolymers of at least two members selected from the group consisting of ethylene, propylene, and butene.

Examples of the aforementioned polymers include a propylene/ethylene copolymer (a copolymer of propylene and ethylene), a propylene/butene copolymer (a copolymer of propylene and butene), and an ethylene/propylene/butene copolymer (a copolymer of ethylene, propylene, and butene).

Note that, as described above, the thermoplastic elastomers (1) do not include the tackifiers (2), and thus the olefin-based thermoplastic elastomer (1c) serving as a thermoplastic elastomer (1) does not include the amorphous polyalphaolefin (2c). Furthermore, in the present specification, an amorphous polyalphaolefin may be referred to as an APAO.

(Weight Average Molecular Weight of the Amorphous Polyalphaolefin (2c))

In view of the effects of the present invention being better, the weight average molecular weight (Mw) of the amorphous polyalphaolefin (2c) is preferably 30,000 to 150,000 and more preferably 40,000 to 100,000.

The method for measuring the weight average molecular weight of the amorphous polyalphaolefin (2c) is the same as the method for measuring the weight average molecular weight of the olefin-based thermoplastic elastomer (1c) described above.

(Content of the Amorphous Polyalphaolefin (2c))

The content of the amorphous polyalphaolefin (2c) is preferably 1 to 20 parts by mass, more preferably 1 to 10 parts by mass, and still more preferably 1 to 5 parts by mass, with respect to 100 parts by mass of the styrene-based thermoplastic elastomer (1a).

<High Molecular Weight Paraffin Oil (3a)>

The composition of the present invention comprises a high molecular weight paraffin oil (3a) having a weight average molecular weight of 1,000 or more, as a paraffin oil.

Because the high molecular weight paraffin oil (3a) is comprised, the composition of the present invention has good hot flow resistance and volatility resistance.

Examples of the high molecular weight paraffin oil (3a) include those obtained by hydrogenating and refining petroleum fractions or residual oils, or lubricating base oils obtained by cracking.

For example, a preferred embodiment can be mentioned which includes a compound represented by the formula $C_nH_{2n+2}$, as the high molecular weight paraffin oil (3a). Note that, in the present invention, the n above can be a value corresponding to the weight average molecular weight of the high molecular weight paraffin oil (3a).

Furthermore, a preferred embodiment can be mentioned in which the high molecular weight paraffin oil (3a) is liquid under conditions of, for example, room temperature (23° C.).

<Weight Average Molecular Weight of the High Molecular Weight Paraffin Oil (3a)>

In the present invention, the weight average molecular weight of the high molecular weight paraffin oil (3a) is 1,000 or more.

In view of the effects of the present invention being better, the weight average molecular weight of the high molecular weight paraffin oil (3a) is preferably 1,200 to 3,000 and more preferably 1,300 to 2,000.

In the present invention, the weight average molecular weight of the paraffin oil refers to the weight average molecular weight in terms of standard polystyrene, based on values measured by gel permeation chromatography (GPC) (same hereinafter). The measurement conditions for the weight average molecular weight of the paraffin oil are as follows.

(Measurement Conditions)
   GPC: LC Solution (made by SHIMAZU)
   Detector: SPD-20A (made by SHIMAZU)
   Column: Two MIXED-Es (made by Polymer Laboratories) in series
   Solvent: tetrahydrofuran
   Temperature: 40° C.
   Flow rate: 0.5 ml/min
   Concentration: 2 mg/ml
   Standard sample: polystyrene <Low Molecular Weight Paraffin Oil (3b)>

The composition of the present invention comprises a low molecular weight paraffin oil (3b) having a weight average molecular weight of less than 1,000 as a paraffin oil.

Because the low molecular weight paraffin oil (3b) is comprised, the composition of the present invention has good workability and balance between adhesion and detachability.

Examples of the low molecular weight paraffin oil (3b) include those obtained by hydrogenating and refining petroleum fractions or residual oils, or lubricating base oils obtained by cracking.

For example, a preferred embodiment can be mentioned which includes a compound represented by the formula $C_nH_{2n+2}$, as the low molecular weight paraffin oil (3b). Note that, in the present invention, the n above can be a value corresponding to the weight average molecular weight of the low molecular weight paraffin oil (3b).

Furthermore, a preferred embodiment can be mentioned in which the low molecular weight paraffin oil (3b) is liquid under conditions of, for example, room temperature (23° C.).

<Weight Average Molecular Weight of the Low Molecular Weight Paraffin Oil (3b)>

In the present invention, the weight average molecular weight of the low molecular weight paraffin oil (3b) is preferably 500 or more but less than 11,000, more preferably 700 or more but less than 1,000.

The method for measuring the weight average molecular weight of the low molecular weight paraffin oil (3b) has the same the measurement conditions as those for the weight average molecular weight of the paraffin oil described above.

(Total Content of the High Molecular Weight Paraffin Oil (3a) and the Low Molecular Weight Paraffin Oil (3b))

In view of the effects of the present invention being better, the total content of the high molecular weight paraffin oil (3a) and the low molecular weight paraffin oil (3b) is preferably 500 to 3,000 parts by mass and more preferably 700 to 1,500 parts by mass, with respect to 100 parts by mass of the styrene-based thermoplastic elastomer (1a).

High Molecular Weight Paraffin Oil (3a)/Low Molecular Weight Paraffin Oil (3b) (Mass Ratio B)

In view of the effects of the present invention (in particular, workability and hot creep resistance) being better, the mass ratio B of the content of the high molecular weight paraffin oil (3a) to the content of the low molecular weight paraffin oil (3b) (high molecular weight paraffin oil (3a)/low molecular weight paraffin oil (3b)) is preferably 5/95 to 95/5, more preferably 20/80 to 70/30, and still more preferably 30/70 to 50/50.

(Additives)

The composition of the present invention may further comprise additives as required. Additives include, for example, thermoplastic elastomers other than the styrene-based thermoplastic elastomers (1a) and (1b), ethylene propylene rubber, and butyl rubber, and antiaging agents such as hindered phenol-based compounds, antioxidants, and ultraviolet absorbers, fillers, softeners or plasticizers other than paraffin oil, and reinforcing agents. The amounts of the additives can be determined as appropriate.

(Production Method)

The method for producing the composition of the present invention is not particularly limited. For example, this can be produced by mixing the essential components and additives that can be used as required described above under conditions of 150 to 250° C.

(Usage Methods)

Methods of using the hot-melt composition of the present invention include, for example, those in which the composition of the present invention is heated to 190 to 230° C., so as to be melted, and applied to an adherend (for example, a first member and/or second member), the adherend is, or the adherends are, bonded or laminated to form a joined body or laminate, and the joined body or laminate is left under room temperature conditions to solidify the composition of the present invention. The material of the second member may be the same as or different from that of the first member.

Examples of substrates (adherends) to which the composition of the present invention can be applied include plastics (for example, polyolefins such as polypropylene, polycarbonates, and (meth)acrylic resins), wood, rubber, glass, and metals.

Adhering a polycarbonate resin, a (meth)acrylic resin, or polypropylene, and adhering a polycarbonate resin or a (meth)acrylic resin with polypropylene are preferred embodiments of the use of the composition of the present invention.

Examples of the method for applying the composition of the present invention to a substrate (adherend) include methods using a dispenser (applicator).

The composition of the present invention can be used, for example, as a hot-melt composition for lamps. Examples of lamps include automobile lamps (for example, headlamps, rear combination lamps, and the like) and two-wheeled vehicle (motorcycle) lamps. In the case of automobile lamps, the composition of the present invention can be used, for example, for sealing (adhesion) between the lens and housing of the automobile lamp, and at a lens seal.

EXAMPLES

The present invention is described below in specific terms by setting forth examples. However, the present invention is not limited to these.
<Production of the Composition>
The thermoplastic elastomers and paraffin oils shown in Table 1 below were used in the amounts (parts by mass) shown in the same table, these being charged into a 3 L double to arm kneader (made by Nihon Spindle Manufacturing Co., Ltd.), and stirred for 40 minutes under conditions of 200° C., to obtain mixtures. Next, compounds corresponding to the tackifiers (2) shown in the same table (or a (comparative) polyterpene resin) and an antiaging agent were added to the mixtures, and these were further mixed for 1 hour to produce hot-melt compositions.

Note that the styrene content of the styrene-based thermoplastic elastomer in Table 1 is indicated as "St xx %", wherein the % means % by mass.
<Evaluations>
The following evaluations were performed using the compositions produced as described above. The results are shown in Table 1.
(Workability)
After melting the compositions produced as described above under conditions of 220° C. for 30 minutes, the viscosities of the compositions were measured and evaluated according to JIS K 6833-1 using a BF type viscometer (Brookfield type viscometer), rotated using a No. 29 rotor at 5 rpm.
Evaluation Criteria for Workability
When the viscosity was 100 Pa·s or less, the workability was evaluated to be very good, which was indicated by "O".
When the viscosity was more than 100 Pa·s and no greater than 150 Pa·s, the workability was evaluated to be somewhat good, which was indicated by "Δ".
Meanwhile, when the viscosity exceeded 150 Pa·s, workability was evaluated as poor, which was indicated by "X".
(Hot Flow Resistance: Vertical Flow)
The compositions produced as described above were melted with a hand gun under conditions of 220° C., and a bead of 4 mm ɸ(diameter)×50 mm in (length) was applied onto an aluminum plate. Then, the aluminum plate was paced in a 120° C. oven, standing at 90°, for 24 hours and the degree of sagging of the material (composition) after 24 hours (after 24 hours, with the aluminum plate standing at 90°, the distance to which the bead sags from the lowest point of adhesion between the aluminum plate and the bead, at the lower surfaces of the plate and the bead attached thereto) was measured.
Evaluation Criteria for Hot Flow Resistance
When the sagging distance was 5 mm or less, the hot flow resistance was evaluated as good, which was indicated by "O".
Meanwhile, when the sagging distance exceeded 5 mm, the hot flow resistance was evaluated as poor, which was indicated by "X".
(Adhesion/Detachability)
Each composition produced as described above was heated to 220° C., melted, and applied to a PP sheet (made of polypropylene, 25 mm long×75 mm wide×3 mm thick). After application, a PC sheet (made of polycarbonate, 25 mm long×75 mm wide×3 mm thick) was overlaid on the composition on the PP sheet so as to form a cross, and clamped so that the composition reached a thickness of 3 mm with an adhesion area of 25 mm×25 mm, and this was left for 24 hours under conditions of 20° C. and 50% RH to cure (solidify), so as to obtain a test piece. The test piece has a hot-melt composition (adhesive layer) between the PP sheet and the PC sheet.

Using a tensile tester, the resulting test piece was subjected to a tensile test in which the PC sheet was pulled in the direction perpendicular to the surface of the PP sheet, under conditions of 20° C. and a pulling speed of 50 mm/min, to measure the peel strength of the test piece. In addition, the condition of the failure surface (failure mode) after failure was visually observed.

The results for each test piece are shown in Table 1 with the measured peel strength as strength (N). In terms of the failure mode, "O" indicates that the adhesive layer was cleanly peeled off from the PP sheet, and "X" indicates that adhesive layer remained on the PP sheet.
Evaluation of the Balance Between Adhesion and Detachability
When the strength (peel strength) was 60 to 130 N and the failure mode was "O", the balance between adhesion and detachability was evaluated as good.

Furthermore, when the strength was 70 to 120 N and the failure mode was "O", the balance between adhesion and detachability was evaluated as better, when the strength was 75 to 90 N and the failure mode was "O", the balance between adhesion and detachability was evaluated as even better.

On the other hand, when the strength was less than 60 N, the adhesion was poor, and therefore the balance between the adhesiveness and detachability was evaluated as poor.

Furthermore, when the strength exceeded 130 N, or when the failure mode was "X", the detachability was poor, and therefore the balance between adhesion and detachability was evaluated as poor.
(Volatility Resistance)
3 g of each composition prepared as described above was placed in a test tube and the top of the test tube was sealed with a glass plate. The test tube was immersed in a 120° C. oil bath and heated.

24 hours after the start of heating, a visual check was made as to whether or not there was staining on the inner surface of the glass plate (the part forming the sealed space with the test tube).

If the inner surface of the glass plate was not stained, this was indicated as "unstained" and the volatility resistance was evaluated as good.

On the other hand, if a stain was found on the inner surface of the glass plate, this was indicated as "stained" and the volatility resistance was evaluated as good.
(Hot Creep Resistance)
Each composition produced as described above was heated to 220° C., melted, and applied to a PP sheet (made of polypropylene, 25 mm long×75 mm wide×3 mm thick). After application, a PC sheet (made of polycarbonate, 25 mm long×75 mm wide×3 mm thick) was overlaid on the composition on the PP sheet so as to form a cross, and clamped so that the composition reached a thickness of 3 mm with an adhesion area of 25 mm×25 mm, and this was left for 24 hours under conditions of 20° C. and 50% RH to cure, so as to obtain a test piece. The test piece has a hot-melt composition (adhesive layer) between the PP sheet and the PC sheet.

The initial test pieces obtained were subjected to a heat resistance test in which the PC sheet was pulled in the direction perpendicular to the surface of the PP sheet, each of the test pieces was fixed in a state where the adhesive layer was stretched by 150%, and these were left in that state for 24 hours under conditions of 60° C.

The degree of peeling of the hot-melt composition (adhesive layer) in the test piece after the heat resistance test (with the fixed state maintained; same hereinafter) was visually checked.

Evaluation Criteria for Hot Creep Resistance

In the test piece after the heat resistance test, if the hot-melt composition (adhesive layer) was not completely peeled off from the substrate, or if the area of the portion where the hot-melt composition was bonded to the PP sheet and the PC sheet was 80% or more of the entire bonding surface (25 mm long×25 mm wide; same hereinafter), this was evaluated as the best hot creep resistance (highest adhesion retention rate after heating), which was indicated by "⊚".

When the area of the portion where the hot-melt composition adheres to the PP sheet and PC sheet was 60% or more but less than 80% of the entire adhesion surface, the hot creep resistance was evaluated as very good (very high adhesion retention rate after heating), which was indicated by "○".

When the area of the portion where the hot-melt composition adheres to the PP sheet and the PC sheet was 30% or more but less than 60% of the entire adhesion surface, the hot creep resistance was evaluated as somewhat good (somewhat high adhesion retention rate after heating), which was indicated by "Δ".

On the other hand, when the area of portion where the hot-melt composition adheres to the PP sheet and the PC sheet was less than 30% of the entire adhesion surface, the hot creep resistance was evaluated as poor (low adhesion retention rate after heating), which was indicated by "X".

TABLE 1

|  | Example 1 | Example 2 | Example 3 | Example 4 | Example 5 |
|---|---|---|---|---|---|
| styrene-based thermoplastic elastomer (1a-1) SEEPS (St 30%, Mw 390,000) | 100 | 100 | 100 | 100 | 100 |
| comparative styrene-based thermoplastic elastomer 1 SEEPS (St 30%, Mw 250,000) |  |  |  |  |  |
| comparative styrene-based thermoplastic elastomer 2 SEBS (St 30%, Mw 110,000) |  |  |  |  |  |
| styrene-based thermoplastic elastomer (1b-1) SEPS (St 13%, Mw 120,000) | 25 | 10 | 50 | 25 | 25 |
| styrene-based thermoplastic elastomer (1b-2) SEBS (St 12%, Mw 180,000) |  |  |  |  |  |
| comparative styrene-based thermoplastic elastomer 3 SEPS (St 65%, Mw 90,000) |  |  |  |  |  |
| olefin-based thermoplastic elastomer (1c-1) EPT rubber | 50 | 50 | 50 | 30 | 70 |
| olefin-based thermoplastic elastomer (1c-2) butyl rubber |  |  |  |  |  |
| aromatic petroleum resin (2a-1) | 200 | 200 | 200 | 200 | 200 |
| terpene phenol resin (2b-1) | 150 | 150 | 150 | 150 | 150 |
| (comparative) polyterpene resin |  |  |  |  |  |
| amorphous polyalphaolefin (2c-1) APAO (propylene/butene) | 3 | 3 | 3 | 3 | 3 |
| amorphous polyalphaolefin (2c-2) APAO (propylene/ethylene) |  |  |  |  |  |
| high molecular weight paraffin oil (3a-1) | 400 | 400 | 400 | 400 | 400 |
| low molecular weight paraffin oil (3b-1) | 600 | 600 | 600 | 600 | 600 |
| antiaging agent | 5 | 5 | 5 | 5 | 5 |
| workability: Pa·s@220° C. | ○ | Δ | ○ | Δ | ○ |
| hot flow resistance (vertical flow 120° C. × 24 hr) | ○ | ○ | ○ | ○ | ○ |
| adhesion/detachability  strength [N] | 80 | 115 | 60 | 103 | 70 |
| failure mode | ○ | ○ | ○ | ○ | ○ |
| volatility resistance: 120° C. × 24 hr | unmarked | unmarked | unmarked | unmarked | unmarked |
| hot creep resistance: 150% elongation, 60° C. × 24 hours | ⊚ | ⊚ | ⊚ | ○ | ○ |

|  | Example 6 | Example 7 | Example 8 | Example 9 | Example 10 |
|---|---|---|---|---|---|
| styrene-based thermoplastic elastomer (1a-1) SEEPS (St 30%, Mw 390,000) | 100 | 100 | 100 | 100 | 100 |
| comparative styrene-based thermoplastic elastomer 1 SEEPS (St 30%, Mw 250,000) |  |  |  |  |  |
| comparative styrene-based thermoplastic elastomer 2 SEBS (St 30%, Mw 110,000) |  |  |  |  |  |
| styrene-based thermoplastic elastomer (1b-1) SEPS (St 13%, Mw 120,000) | 25 | 25 | 25 | 25 |  |
| styrene-based thermoplastic elastomer (1b-2) SEBS (St 12%, Mw 180,000) |  |  |  |  | 25 |
| comparative styrene-based thermoplastic elastomer 3 SEPS (St 65%, Mw 90,000) |  |  |  |  |  |

TABLE 1-continued

|  |  |  |  |  |  |
|---|---|---|---|---|---|
| olefin-based thermoplastic elastomer (1c-1) EPT rubber | 50 | 50 | 50 | 50 | 50 |
| olefin-based thermoplastic elastomer (1c-2) butyl rubber |  |  |  |  |  |
| aromatic petroleum resin (2a-1) | 250 | 150 | 200 | 200 | 200 |
| terpene phenol resin (2b-1) | 200 | 100 | 150 | 150 | 150 |
| (comparative) polyterpene resin |  |  |  |  |  |
| amorphous polyalphaolefin (2c-1) APAO (propylene/butene) | 3 | 3 | 3 | 3 | 3 |
| amorphous polyalphaolefin (2c-2) APAO (propylene/ethylene) |  |  |  |  |  |
| high molecular weight paraffin oil (3a-1) | 400 | 400 | 200 | 400 | 400 |
| low molecular weight paraffin oil (3b-1) | 600 | 600 | 800 | 600 | 600 |
| antiaging agent | 5 | 5 | 5 | 5 | 5 |
| workability: Pa · s@220° C. | ○ | Δ | ○ | ○ | ○ |
| hot flow resistance (vertical flow 120° C. × 24 hr) | ○ | ○ | ○ | ○ | ○ |
| adhesion/detachability strength [N] | 129 | 126 | 68 | 95 | 77 |
| failure mode | ○ | ○ | ○ | ○ | ○ |
| volatility resistance: 120° C. × 24 hr | unmarked | unmarked | unmarked | unmarked | unmarked |
| hot creep resistance: 150% elongation, 60° C. × 24 hours | ○ | ○ | ○ | ○ | ○ |

|  | Example 11 | Example 12 | Example 13 | Example 14 |
|---|---|---|---|---|
| styrene-based thermoplastic elastomer (1a-1) SEEPS (St 30%, Mw 390,000) | 100 | 100 | 100 | 100 |
| comparative styrene-based thermoplastic elastomer 1 SEEPS (St 30%, Mw 250,000) |  |  |  |  |
| comparative styrene-based thermoplastic elastomer 2 SEBS (St 30%, Mw 110,000) |  |  |  |  |
| styrene-based thermoplastic elastomer (1b-1) SEPS (St 13%, Mw 120,000) | 25 | 25 | 25 | 25 |
| styrene-based thermoplastic elastomer (1b-2) SEBS (St 12%, Mw 180,000) |  |  |  |  |
| comparative styrene-based thermoplastic elastomer 3 SEPS (St 65%, Mw 90,000) |  |  |  |  |
| olefin-based thermoplastic elastomer (1c-1) EPT rubber |  | 50 | 50 | 50 |
| olefin-based thermoplastic elastomer (1c-2) butyl rubber | 50 |  |  |  |
| aromatic petroleum resin (2a-1) | 200 | 200 | 200 | 100 |
| terpene phenol resin (2b-1) | 150 | 150 | 150 | 100 |
| (comparative) polyterpene resin |  |  |  |  |
| amorphous polyalphaolefin (2c-1) APAO (propylene/butene) | 3 |  | 3 | 3 |
| amorphous polyalphaolefin (2c-2) APAO (propylene/ethylene) |  | 3 |  |  |
| high molecular weight paraffin oil (3a-1) | 400 | 400 | 600 | 400 |
| low molecular weight paraffin oil (3b-1) | 600 | 600 | 400 | 600 |
| antiaging agent | 5 | 5 | 5 | 5 |
| workability: Pa · s@220° C. | ○ | ○ | Δ | Δ |
| hot flow resistance (vertical flow 120° C. × 24 hr) | ○ | ○ | ○ | ○ |
| adhesion/detachability strength [N] | 61 | 84 | 78 | 65 |
| failure mode | ○ | ○ | ○ | ○ |
| volatility resistance: 120° C. × 24 hr | unmarked | unmarked | unmarked | unmarked |
| hot creep resistance: 150% elongation, 60° C. × 24 hours | ○ | ○ | ○ | ○ |

|  | Comparative Example 1 | Comparative Example 2 | Comparative Example 3 | Comparative Example 4 |
|---|---|---|---|---|
| styrene-based thermoplastic elastomer (1a-1) SEEPS (St 30%, Mw 390,000) |  | 100 | 100 | 100 |
| comparative styrene-based thermoplastic elastomer 1 SEEPS (St 30%, Mw 250,000) | 100 |  |  |  |
| comparative styrene-based thermoplastic elastomer 2 SEBS (St 30%, Mw 110,000) |  |  |  |  |
| styrene-based thermoplastic elastomer (1b-1) SEPS (St 13%, Mw 120,000) | 25 |  |  | 25 |
| styrene-based thermoplastic elastomer (1b-2) SEBS (St 12%, Mw 180,000) |  |  |  |  |
| comparative styrene-based thermoplastic elastomer 3 SEPS (St 65%, Mw 90,000) |  |  | 25 |  |
| olefin-based thermoplastic elastomer (1c-1) EPT rubber | 50 | 50 | 50 |  |
| olefin-based thermoplastic elastomer (1c-2) butyl rubber |  |  |  |  |

TABLE 1-continued

|  | | | | |
|---|---|---|---|---|
| aromatic petroleum resin (2a-1) | 200 | 200 | 200 | 200 |
| terpene phenol resin (2b-1) | 150 | 150 | 150 | 150 |
| (comparative) polyterpene resin | | | | |
| amorphous polyalphaolefin (2c-1) APAO (propylene/butene) | 3 | 3 | 3 | 3 |
| amorphous polyalphaolefin (2c-2) APAO (propylene/ethylene) | | | | |
| high molecular weight paraffin oil (3a-1) | 400 | 400 | 400 | 400 |
| low molecular weight paraffin oil (3b-1) | 600 | 600 | 600 | 600 |
| antiaging agent | 5 | 5 | 5 | 5 |
| workability: Pa · s@220° C. | ○ | x | ○ | x |
| hot flow resistance (vertical flow 120° C. × 24 hr) | x | ○ | x | ○ |
| adhesion/detachability  strength [N] | 33 | 57 | 250 | 101 |
| failure mode | ○ | ○ | ○ | ○ |
| volatility resistance: 120° C. × 24 hr | unmarked | unmarked | unmarked | unmarked |
| hot creep resistance: 150% elongation, 60° C. × 24 hours | ○ | Δ | ○ | x |

|  | Comparative Example 5 | Comparative Example 6 | Comparative Example 7 | Comparative Example 8 |
|---|---|---|---|---|---|
| styrene-based thermoplastic elastomer (1a-1) SEEPS (St 30%, Mw 390,000) | 100 | 100 | 100 | 100 |
| comparative styrene-based thermoplastic elastomer 1 SEEPS (St 30%, Mw 250,000) | | | | |
| comparative styrene-based thermoplastic elastomer 2 SEBS (St 30%, Mw 110,000) | | | | |
| styrene-based thermoplastic elastomer (1b-1) SEPS (St 13%, Mw 120,000) | 25 | 25 | 25 | 25 |
| styrene-based thermoplastic elastomer (1b-2) SEBS (St 12%, Mw 180,000) | | | | |
| comparative styrene-based thermoplastic elastomer 3 SEPS (St 65%, Mw 90,000) | | | | |
| olefin-based thermoplastic elastomer (1c-1) EPT rubber | 50 | 50 | 50 | 50 |
| olefin-based thermoplastic elastomer (1c-2) butyl rubber | | | | |
| aromatic petroleum resin (2a-1) | | 350 | 200 | 200 |
| terpene phenol resin (2b-1) | 350 | | | 150 |
| (comparative) polyterpene resin | | | 150 | |
| amorphous polyalphaolefin (2c-1) APAO (propylene/butene) | 3 | 3 | 3 | |
| amorphous polyalphaolefin (2c-2) APAO (propylene/ethylene) | | | | |
| high molecular weight paraffin oil (3a-1) | 400 | 400 | 400 | 400 |
| low molecular weight paraffin oil (3b-1) | 600 | 600 | 600 | 600 |
| antiaging agent | 5 | 5 | 5 | 5 |
| workability: Pa · s@220° C. | Δ | x | x | ○ |
| hot flow resistance (vertical flow 120° C. × 24 hr) | ○ | ○ | ○ | ○ |
| adhesion/detachability  strength [N] | 39 | 180 | 33 | 41 |
| failure mode | x | ○ | ○ | ○ |
| volatility resistance: 120° C. × 24 hr | unmarked | unmarked | unmarked | unmarked |
| hot creep resistance: 150% elongation, 60° C. × 24 hours | ○ | Δ | ○ | Δ |

|  | Comparative Example 9 | Comparative Example 10 | Comparative Example 11 | Comparative Example 12 |
|---|---|---|---|---|---|
| styrene-based thermoplastic elastomer (1a-1) SEEPS (St 30%, Mw 390,000) | 100 | 100 | 100 | 100 |
| comparative styrene-based thermoplastic elastomer 1 SEEPS (St 30%, Mw 250,000) | | | | |
| comparative styrene-based thermoplastic elastomer 2 SEBS (St 30%, Mw 110,000) | | | | |
| styrene-based thermoplastic elastomer (1b-1) SEPS (St 13%, Mw 120,000) | 25 | | | |
| styrene-based thermoplastic elastomer (1b-2) SEBS (St 12%, Mw 180,000) | | | | |
| comparative styrene-based thermoplastic elastomer 3 SEPS (St 65%, Mw 90,000) | | | | |
| olefin-based thermoplastic elastomer (1c-1) EPT rubber | 50 | | | |
| olefin-based thermoplastic elastomer (1c-2) butyl rubber | | | | |

TABLE 1-continued

|  | | | | |
|---|---|---|---|---|
| aromatic petroleum resin (2a-1) | 200 | 350 | 200 | 200 |
| terpene phenol resin (2b-1) | 150 | | | |
| (comparative) polyterpene resin | | | 150 | 150 |
| amorphous polyalphaolefin (2c-1) APAO (propylene/butene) | 3 | 3 | | 3 |
| amorphous polyalphaolefin (2c-2) APAO (propylene/ethylene) | | | | |
| high molecular weight paraffin oil (3a-1) | | 400 | 400 | 400 |
| low molecular weight paraffin oil (3b-1) | 1000 | 600 | 600 | 500 |
| antiaging agent | 5 | 5 | 5 | 5 |
| workability: Pa · s@220° C. | ○ | ○ | x | x |
| hot flow resistance (vertical flow 120° C. x 24 hr) | x | ○ | ○ | ○ |
| adhesion/detachability strength [N] | 81 | 63 | 45 | 49 |
| failure mode | ○ | ○ | ○ | ○ |
| volatility resistance: 120° C. x 24 hr | marked | unmarked | unmarked | unmarked |
| hot creep resistance: 150% elongation, 60° C. x 24 hours | ○ | x | x | x |

|  | Comparative Example 13 | Comparative Example 14 | Comparative Example 15 | Comparative Example 16 |
|---|---|---|---|---|
| styrene-based thermoplastic elastomer (1a-1) SEEPS (St 30%, Mw 390,000) | 100 | 100 | | 100 |
| comparative styrene-based thermoplastic elastomer 1 SEEPS (St 30%, Mw 250,000) | | | | |
| comparative styrene-based thermoplastic elastomer 2 SEBS (St 30%, Mw 110,000) | | | 100 | 25 |
| styrene-based thermoplastic elastomer (1b-1) SEPS (St 13%, Mw 120,000) | | | | |
| styrene-based thermoplastic elastomer (1b-2) SEBS (St 12%, Mw 180,000) | | | | |
| comparative styrene-based thermoplastic elastomer 3 SEPS (St 65%, Mw 90,000) | | | | |
| olefin-based thermoplastic elastomer (1c-1) EPT rubber | | | 60 | 50 |
| olefin-based thermoplastic elastomer (1c-2) butyl rubber | | | 100 | |
| aromatic petroleum resin (2a-1) | 200 | 350 | 250 | 200 |
| terpene phenol resin (2b-1) | 150 | | 90 | 150 |
| (comparative) polyterpene resin | | | | |
| amorphous polyalphaolefin (2c-1) APAO (propylene/butene) | 3 | | | 3 |
| amorphous polyalphaolefin (2c-2) APAO (propylene/ethylene) | | | | |
| high molecular weight paraffin oil (3a-1) | 400 | 1000 | 150 | 400 |
| low molecular weight paraffin oil (3b-1) | 600 | | | 600 |
| antiaging agent | 5 | 5 | 5 | 5 |
| workability: Pa · s@220° C. | x | Δ | ○ | ○ |
| hot flow resistance (vertical flow 120° C. x 24 hr) | ○ | ○ | ○ | x |
| adhesion/detachability strength [N] | 63 | 90 | 210 | 67 |
| failure mode | ○ | ○ | x | ○ |
| volatility resistance: 120° C. x 24 hr | unmarked | unmarked | unmarked | unmarked |
| hot creep resistance: 150% elongation, 60° C. x 24 hours | x | x | ○ | Δ |

The details for each component shown in Table 1 are as follows.

<Styrene-Based Thermoplastic Elastomer (1a)>

Styrene-based thermoplastic elastomer (1a-1): SEEPS (St content: 30% by mass, Mw: 390,000). Product name: Septon 4077, made by Kuraray Co., Ltd.

Comparative styrene-based thermoplastic elastomer 1: SEEPS (St content: 30% by mass, Mw: 250,000). Product name Septon 4055, made by Kuraray Co., Ltd.

Comparative styrene-based thermoplastic elastomer 2: SEBS (St content: 30% by mass: Mw 110,000). Product name: Kraton G1650, made by Kuraray Co., Ltd.

<Styrene-Based Thermoplastic Elastomer (1b)>

Styrene-based thermoplastic elastomer (1b-1): SEPS (St content: 13% by mass, Mw: 120,000). Product name: Septon 2063, made by Kuraray.

Styrene-based thermoplastic elastomer (1b-2): SEBS (St content: 12% by mass, Mw: 180,000). Product name: Tuftec H-1221, made by Asahi Kasei Corp.

Comparative styrene-based thermoplastic elastomer 3: SEPS (St content 65% by mass, Mw 90,000). product name Septon 2104, made by Kuraray Co., Ltd.

Note that, none of the comparative styrene-based thermoplastic elastomers 1 to 3 corresponds to the styrene-based thermoplastic elastomer (1a) or the styrene-based thermoplastic elastomer (1b) in the present invention.

<Olefin-Based Thermoplastic Elastomer (1c)>

Olefin-based thermoplastic elastomer (1c-1): ethylene propylene rubber. product name Mitsui EPT0045, made by Mitsui Chemicals. No third component (as monomer). Mw 350,000. Rubber formed only from ethylene and propylene Olefin-based thermoplastic elastomer (1c-2): butyl rubber. product name Butyl 365, made by JSR. Mw 440,000

<<Tackifier (2)>>

<Aromatic Petroleum Resin (2a)>

Aromatic petroleum resin (2a-1): aromatic hydrocarbon-based resin (styrene-based hydrocarbon resin). product name FMR0150, made by Mitsui Chemicals.

<Terpene Phenol Resin (2b)>

Terpene phenol resin (2b-1): product name YS Polyster U115, made by Yasuhara Chemical Co., Ltd. A non to hydrogenated terpene phenol-based resin.

(Comparative) Polyterpene resin: terpene monomer homopolymer (100%) resin. Product name YS Resin PX1150, made by Yasuhara Chemical Co., Ltd.

<Amorphous Polyalphaolefin (2c)>

Amorphous polyalphaolefin (2c-1): APAO (propylene/butene-1 copolymer). product name RT2780, made by Rextac. Mw 70,000

Amorphous polyalphaolefin (2c-2): APAO (propylene/ethylene copolymer). product name RT2585, made by Rextac. Mw 60,000

<High Molecular Weight Paraffin Oil (3a)>

High molecular weight paraffin oil (3a-1): high molecular weight paraffin oil. Weight average molecular weight 1500. Product name: PW-380, made by Idemitsu Kosan Co., Ltd.

<Low Molecular Weight Paraffin Oil (3b)>

Low molecular weight paraffin oil (3b-1): Low molecular weight paraffin oil. Weight average molecular weight 900. Product name: PW-90, made by Idemitsu Kosan Co., Ltd.

(Antiaging Agent)

Antiaging agent: hindered phenol-based compound. product name Irganox 1010, made by BASF.

As is clear from the results shown in Table 1, Comparative Example 1, which did not comprise the specific St-based elastomer (1a) and instead comprised the comparative styrene-based thermoplastic elastomer 1, had poor hot flow resistance.

Comparative Example 2, which did not comprise the specific St-based elastomer (1b), had poor workability and poor adhesion, and therefore poor balance between adhesion and detachability.

Comparative Example 3, which did not comprise the specific St-based elastomer (1b), and instead comprised the comparative styrene-based thermoplastic elastomer 3, had poor hot flow resistance and poor detachability, and therefore poor balance between adhesion and detachability.

Comparative Example 4, which did not comprise the specific olefin-based elastomer (1c), had good balance between adhesion and detachability but had poor workability and hot creep resistance.

Comparative Example 5, which did not comprise the aromatic petroleum resin (2a), had poor adhesion and detachability, and therefore poor balance between adhesion and detachability.

Comparative Example 6, which did not comprise the terpene phenol resin (2b), had poor workability and detachability, and therefore poor balance between adhesion and detachability.

Comparative Example 7, which did not comprise a terpene phenol-based resin (2b), and instead comprised a polyterpene resin, had poor workability and poor adhesion, and therefore poor balance between adhesion and detachability.

Comparative Example 8, which did not comprise the amorphous polyphaolefin (2c), had poor adhesion and poor balance between adhesion and detachability.

Comparative Example 9 which did not comprise high molecular weight paraffin oil (3a) had poor hot flow resistance and volatility resistance.

Comparative Example 10, which did not comprise the specific St-based elastomer (1b), the specific olefin-based elastomer (1c), or the terpene phenol resin (2b), had poor hot creep resistance.

Comparative Example 11 which did not comprise the specific St-based elastomer (1b), the specific olefin-based elastomer (1c), the terpene phenol resin (2b), or the amorphous polyalphaolefin (2c), and comprised a polyterpene resin instead of the terpene phenol resin (2b), had poor workability and poor adhesion, and therefore poor balance between adhesion and detachability, and poor hot creep resistance.

Comparative Example 12 which did not comprise the specific St-based elastomer (1b), the specific olefin-based elastomer (1c) or the terpene phenol-based resin (2b), and comprised a polyterpene resin instead of the terpene phenol resin (2b), had poor workability and poor adhesion, and therefore poor balance between adhesion and detachability, and poor hot creep resistance.

Comparative Example 13, which did not comprise the specific St-based elastomer (1b) or the specific olefin-based elastomer (1c), had poor workability and hot creep resistance.

Comparative Example 14, which did not comprise the specific olefin-based elastomer (1c), the terpene phenol-based resin (2b), the amorphous polyalphaolefin (2c), or the low molecular weight paraffin oil (3b), had poor hot creep resistance.

Comparative Example 15, which did not comprise the specific St-based elastomer (1a), and instead comprised the comparative styrene-based thermoplastic elastomer 2, and which did not comprise the specific St-based elastomer (1b), the amorphous polyalphaolefin (2c), or the low molecular weight paraffin oil (3b), had excessively strong adhesion and could not be detached, and as such the balance between adhesion and detachability was poor.

Comparative Example 16, which did not comprise the specific St-based elastomer (1b), and instead comprised the comparative styrene-based thermoplastic elastomer 2 had poor hot flow resistance.

In contrast, the composition of the present invention had good workability, hot flow resistance, balance between adhesion and detachability, volatility resistance, and hot creep resistance.

The invention claimed is:

1. A hot-melt composition comprising: as thermoplastic elastomers, a styrene-based thermoplastic elastomer (1a) having a weight average molecular weight of 300,000 or more, a styrene-based thermoplastic elastomer (1b) having a styrene content of no greater than 20% by mass, and an olefin-based thermoplastic elastomer including an ethylene propylene rubber and/or butyl rubber;
   as tackifiers, an aromatic petroleum resin, a terpene phenol resin, and an amorphous polyalphaolefin;
   a high molecular weight paraffin oil having a weight average molecular weight of 1,000 or more; and
   a low molecular weight paraffin oil having a weight average molecular weight of less than 1,000.

2. The hot-melt composition according to claim 1, wherein the content of the styrene-based thermoplastic elastomer (1b) is 10 to 50 parts by mass, with respect to 100 parts by mass of the styrene-based thermoplastic elastomer (1a).

3. The hot-melt composition according to claim 1, wherein the content of the olefin-based thermoplastic elastomer is 30 to 70 parts by mass, with respect to 100 parts by mass of the styrene-based thermoplastic elastomer (1a).

4. The hot-melt composition according to claim 1, wherein the styrene-based thermoplastic elastomer (1a) includes SEEPS.

5. The hot-melt composition according to claim 1, wherein the total content of the aromatic petroleum resin and the terpene phenol resin is 200 to 600 parts by mass, with respect to 100 parts by mass of the styrene-based thermoplastic elastomer (1a).

* * * * *